June 28, 1955
W. R. AIKEN
2,712,114
MARKER PULSE GENERATOR
Filed July 18, 1951
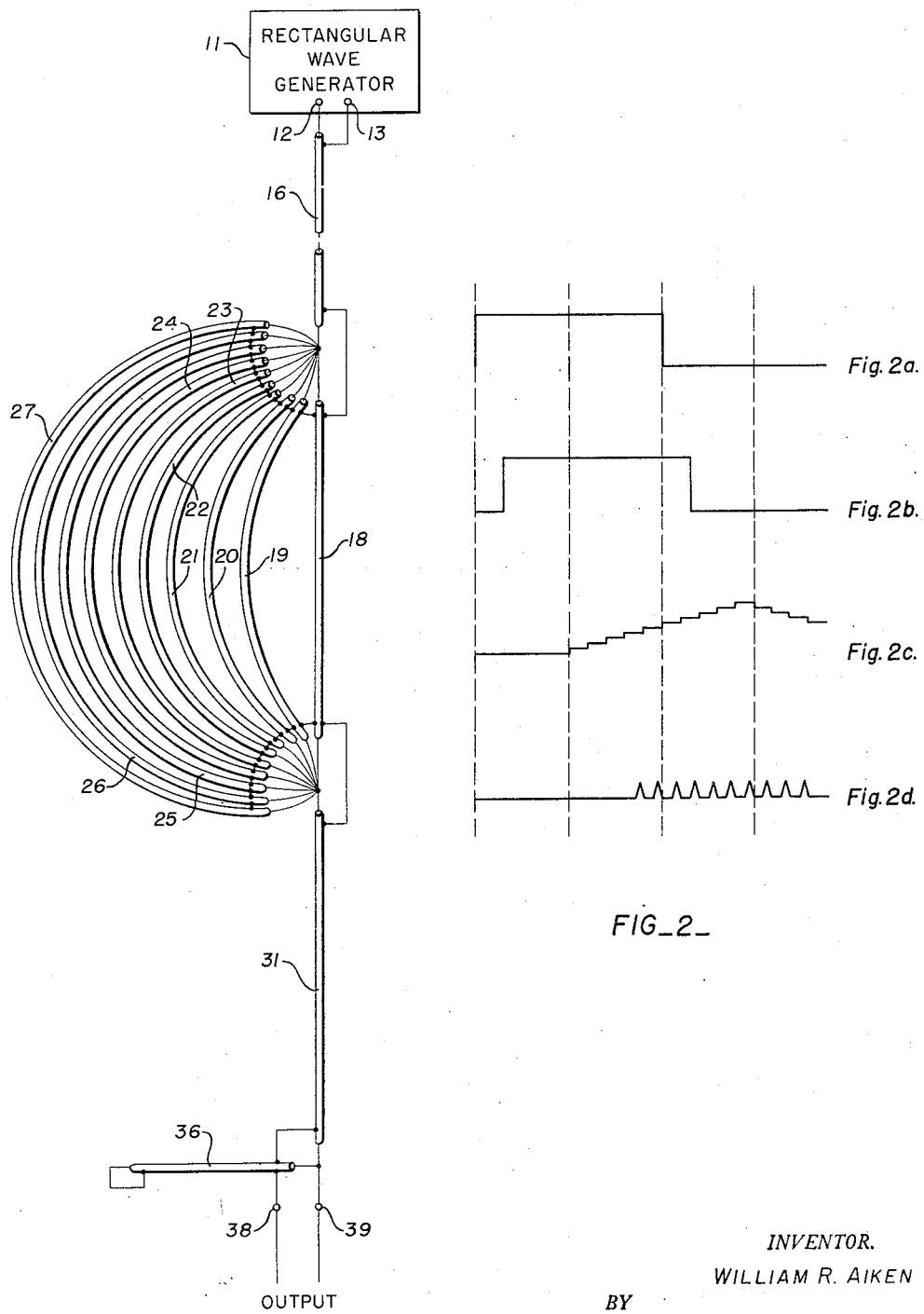
FIG_1_
FIG_2_
INVENTOR.
WILLIAM R. AIKEN
BY
*Roland A. Anderson*
ATTORNEY.

United States Patent Office 2,712,114
Patented June 28, 1955

2,712,114

MARKER PULSE GENERATOR

William Ross Aiken, Berkeley, Calif., assignor to the United States of America as represented by the United States Atomic Energy Commission Application July 18, 1951, Serial No. 237,445

4 Claims. (Cl. 333—20)

This invention relates to a system of electrically interconnected sections of coaxial transmission line and more particularly to a delay line marker pulse generator.

Several systems for generating or developing marker pulses have been used in radar and television equipment and as auxiliary circuits with oscilloscopes. An electronic range-marker circuit is shown in Fig. 40 on page 2–73 of Principles of Radar by M. I. T. Radar School Staff, second edition, 1946, McGraw-Hill Book Company, Inc. It will be readily apparent that such a circuit is subject to variations because of changes in characteristics of the numerous elements. Another type of marker pulse system in use involves a slotted disk which is rotated at variable speeds by a motor. A light source is mounted with respect to the slot in the disk so that the light projects therethrough at each revolution. A photoelectric cell disposed to receive such light is connected to an amplifier circuit and the pulses at the output thereof form marker pulses. The latter system, it will be seen, is subject to variations in the speed of the motor and to the sensitivity of the photoelectric cell as well as the necessary amplifier circuit.

The present invention provides an inherently stable system for generating marker pulses and merely requires one type of material. It is well known that coaxial cables have certain characteristics which are useful in the communication field and in many electronic circuits. The basic theory of electrical transmission in coaxial cables, which is similar to that for a two-wire transmission line, has been fully covered in numerous standard texts, such as, Communication Engineering by Everitt, second edition, 1937, McGraw-Hill Book Company, Inc., so that it is not necessary to set forth such principles here. By interconnecting a plurality of different length coaxial cables and a section of short-circuited coaxial cable, a system may be formed which has an output comprising a series of marker pulses for each rectangular voltage wave impressed at the input.

It is therefore an object of the present invention to provide a new and improved marker pulse generator.

Another object of the present invention is to provide a marker pulse generator having an inherently high stability.

Still another object of the present invention is to provide a marker pulse generator made up entirely of sections of coaxial transmission line.

A further object of the present invention is to provide a marker pulse generator having a plurality of parallel-connected sections of coaxial cable and a short-circuited section of coaxial cable connected thereto.

Further objects and advantages of the present invention will be apparent from the following description and claims considered together with the accompanying drawing in which:

Figure 1 is a schematic wiring diagram of the invention; and

Figure 2 is a series of time correlated waveforms of voltage occurring at points of the circuit of Fig. 1 which will be designated hereinafter.

Referring to the drawing in detail, and Fig. 1 in particular, there is provided a rectangular wave generator 11 having the output terminals 12 and 13 thereof connected to the inner and outer conductors, respectively, of a coaxial cable 16. The length of the coaxial cable 16 is not critical, provided the generator 11 and the cable are suitably matched, and may, therefore, be of any desired length to transmit the output of the generator 11 from the location thereof to the position of the remainder of the device. In the present embodiment of the invention, as illustrated in the drawing, ten parallel connected sections of coaxial cable 18–27, inclusive, are provided with the inner conductors thereof connected to the inner conductor of the cable 16 and the outer conductors connected to the outer conductor of the cable 16.

With the generator 11 suitably energized to periodically impress a rectangular voltage, as shown in Fig. 2a, across the conductors of the cable 16, it will be readily apparent that such rectangular voltage will be transmitted thereby and arrive at a delayed time later at the parallel connected cables 18–27, inclusive, as illustrated in Fig. 2b. Such time delay is a function of the distributed inductance and capacitance of the coaxial cable used and may be readily calculated by means of well-known formulae set forth in the above-mentioned text.

Each of the parallel cables 18–27, for the purpose of the present invention, is cut to have a time delay different from the others by an amount which is a fraction of the duration of the rectangular voltage impressed. Thus, if the shortest cable 18 has a time delay of .05 microsecond, the duration of the rectangular voltage is 0.1 microsecond, and the number of parallel cables is ten, it will be seen that the next cable 19 by length has a time delay of .06 microsecond, the next cable 20 by length has a time delay of .07 microsecond, and so on to the longest cable 27 which has a time delay of 0.14 microsecond. With the connections as set forth thus far the occurrence of a rectangular voltage at the connection between the cable 16 and the cables 18–27, inclusive, a fractional portion of such voltage will be transmitted along each of the parallel cables 18–27, inclusive. Thus, at the terminal end of the parallel cables 18–27 a voltage is developed which increases in steps, as illustrated in Fig. 2c. The first step of such stepped voltage occurs at a time later than the input voltage and the delay is proportional to the length of the shortest cable 18. At a later time, equivalent to the difference in time delays between the shortest cable 18 and the next shortest cable 19, the voltage of the next shortest cable 19 reaches the terminal end of the cables 18–27 and adds to the already existing voltage. Such action is repeated for each of the cables 18–27, inclusive, to form the stepped voltage of Fig. 2c.

The terminal end of the plurality of cables 18–27 is connected to one end of another section of cable 31 having the same characteristics as each of the plurality of cables and a length substantially equal to the shortest cable 18. The lengths of the cables 18 and 31 have been determined to minimize the effects of voltage reflections by providing such time delays as will prevent reflections from reaching the output terminal 39 before the ten marker pulses have appeared at this output. The other end of the cable 31 is connected to a load circuit, such as between the cathode and grid of an electron gun of a cathode ray tube.

To convert the stepped voltage, referenced above, into a series of voltage pulses of substantially the same maximum value, a pulse-forming stub 36 is connected at one end across the load end of the cable 31. Such stub 36 comprises a length of cable, similar in characteristics to the other cables used, which is short circuited at the other end. The length of the stub 36 is chosen so that the time delay thereof is short as compared to the duration of each step of the stepped voltage which is impressed. Under such conditions the stub 36 functions as a pulse-forming circuit by reflecting a voltage wave of reversed polarity to cancel the impressed voltage after a time proportional to two times the delay time of the stub. Thus, each time one of the steps of the impressed voltage occurs, a pulse of voltage is developed and appears across output terminals 38 and 39 which are respectively connected to the load end of the cable 31 and a voltage, as illustrated at Fig. 2d, having a series of pulses equivalent in number to the number of parallel cables.

From the foregoing it is readily apparent that a series of uniformly spaced marker pulses of any desired number may be developed by proper selection of the number of cables to be connected in parallel and of the relative lengths thereof. It will also be apparent that by using only sections of coaxial cable in the present invention that an inherently stable pulse generator is provided, since the circuit constants do not vary with use.

While the present invention has been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. A delay line pulse generator comprising a rectangular wave generator, a plurality of parallel-connected coaxial cables having graded lengths connected at one end to the output of said generator, the difference between time delays being less than the duration of each rectangular wave output of said generator, a pair of output terminals, means coupling the other end of said plurality of cables to said output terminals, and a pulse forming stub having a time delay less than one-half of the minimum difference between time delays of said plurality of cables and being connected to said output terminals whereby a cancelling reflected voltage is produced at said stub during each period corresponding to the difference in delay times of said plurality of cables.

2. A delay line pulse generator comprising a source of rectangular voltages, a plurality of parallel-connected coaxial cables having lengths uniformly graded between the shortest and the longest thereof, the difference between time delays of said cables being less than the duration of each of said rectangular voltages, one end of said plurality of cables being coupled to said source, a pair of output terminals, a length of coaxial cables connected between the other end of said plurality of cables and said output terminals, and a length of coaxial cable connected at one end to said output terminals and short circuited at the other end to establish a delay time less than one-half of the minimum difference between time delays of said plurality of cables.

3. A delay line pulse generator comprising a source of rectangular voltages, a plurality of coaxial cables of graded lengths having the inner conductors connected together and the outer conductors connected together at each end, the difference in time delays of said cables being less than the duration of said rectangular voltages, means coupling said rectangular voltages to one end of said plurality of cables to form a stepped voltage at the other end thereof, a pair of output terminals, a coaxial cable having a length substantially equal to the shortest of said plurality of cables connected between said plurality of cables and said output terminals, and a pulse forming stub connected to said output terminals, said stub having a time delay less than one-half of the minimum difference between time delays of said plurality of cables whereby a cancelling voltage is reflected at each step of said stepped voltage.

4. A delay line pulse generator comprising a source of rectangular voltages, a plurality of parallel-connected coaxial cables having uniformly graded lengths coupled at one end to said source, the difference in time delays of said cables being less than the duration of said rectangular voltages, a pair of output terminals, a section of coaxial cable having substantially the same length as the shortest of said plurality of cables connected between the other end of said plurality of cables and said output terminals, and a short-circuited coaxial cable stub connected to said output terminals, said stub having a time delay less than one-half of the minimum difference between time delays of said plurality of cables.

References Cited in the file of this patent

UNITED STATES PATENTS

| 1,647,242 | Mills | Nov. 1, 1927 |
| 1,926,097 | Hansell | Sept. 12, 1933 |
| 2,145,332 | Bedford | Jan. 31, 1939 |
| 2,220,009 | Nuttall | May 7, 1940 |
| 2,227,052 | White | Dec. 31, 1940 |
| 2,335,723 | Alford | Nov. 30, 1943 |
| 2,434,904 | Busignies | Jan. 27, 1948 |
| 2,498,636 | Bassett et al. | Feb. 28, 1950 |
| 2,531,164 | Sands et al. | Nov. 21, 1950 |
| 2,546,371 | Peterson | Mar. 27, 1951 |
| 2,552,160 | Espley | May 8, 1951 |

FOREIGN PATENTS

| 986,448 | France | Mar. 28, 1951 |